C. O. PAUL & E. ELSEY.
AUTOMOBILE HEADLIGHT.
APPLICATION FILED MAR. 23, 1918.

1,290,650.

Patented Jan. 7, 1919.

Inventor
C. O. Paul,
E. Elsey,
By Victor J. Evans
Attorney

WITNESSES

C. O. PAUL & E. ELSEY.
AUTOMOBILE HEADLIGHT.
APPLICATION FILED MAR. 23, 1918.
1,290,650.
Patented Jan. 7, 1919.
2 SHEETS—SHEET 2.
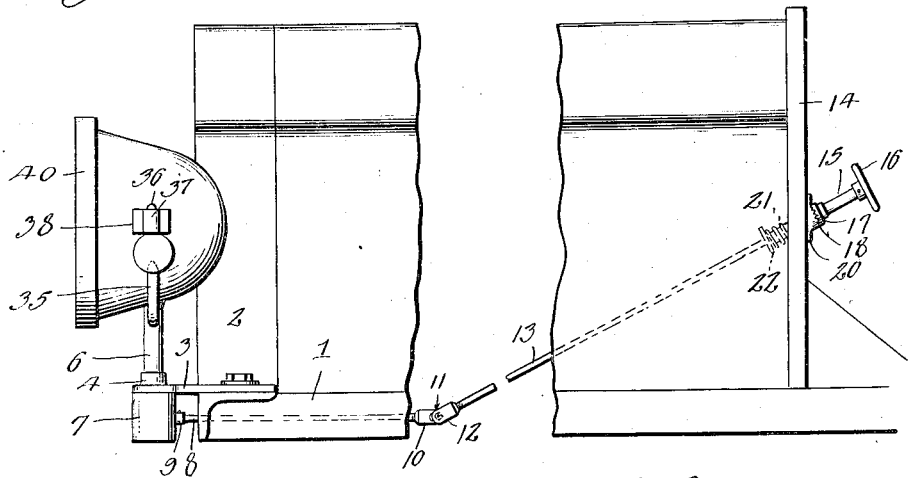
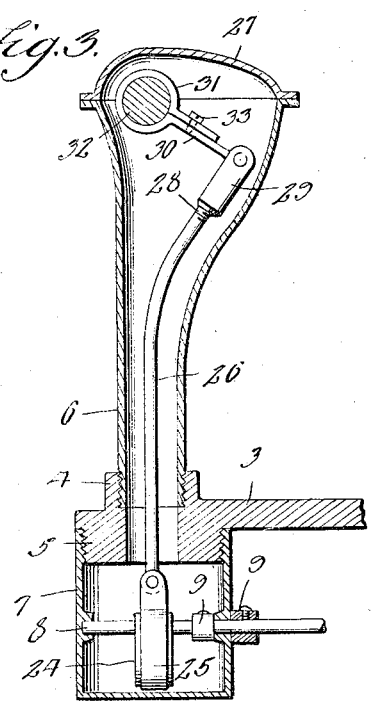
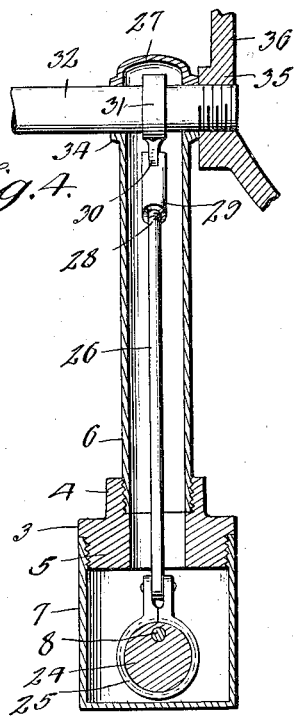
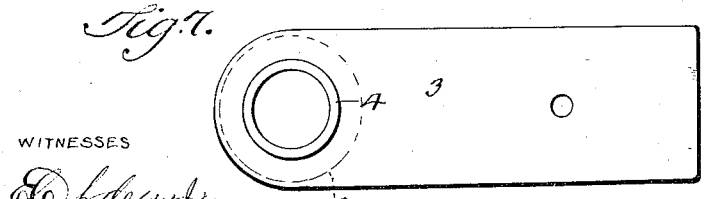
WITNESSES
Inventors
C. O. Paul,
E. Elsey,
By Victor J. Evans
Attorney

UNITED STATES PATENT OFFICE.

CHARLES O. PAUL AND EARL ELSEY, OF SEATTLE, WASHINGTON.

AUTOMOBILE-HEADLIGHT.

1,290,650.　　　　　Specification of Letters Patent.　　Patented Jan. 7, 1919.

Application filed March 23, 1918. Serial No. 224,099.

*To all whom it may concern:*

Be it known that we, CHARLES O. PAUL and EARL ELSEY, citizens of the United States, residing at Seattle, in the county of King and State of Washington, have invented new and useful Improvements in Automobile-Headlights, of which the following is a specification.

This invention relates to headlights for automobiles, and has for its principal object to provide means for projecting or casting a light at a downward angle in front of the machine and for maintaining the same at such angle after diminishing or modifying the reflecting and illuminating qualities of the lamp, as well as to provide for the ready restoration of the light to its normal position, and to automatically lock the same in any of its positions.

A further object of the invention is to produce a novel means for mounting the headlights of automobiles whereby the same may be readily attached to any make of such machines and which is provided with simple means operated from the driver's seat for tilting and holding the light at any desired angle.

Other objects and advantages will appear as the nature of the invention is better understood, reference being had to the accompanying drawings, in which, Figure 1 is a front elevation of an automobile equipped with the improvement.

Fig. 3 is a sectional view approximately on the line 3—3 of Fig. 2.

Fig. 4 is a sectional view approximately on the line 4—4 of Fig. 2.

Fig. 5 is a side elevation.

Fig. 7 is a plan view of one of the brackets.

Figure 1:
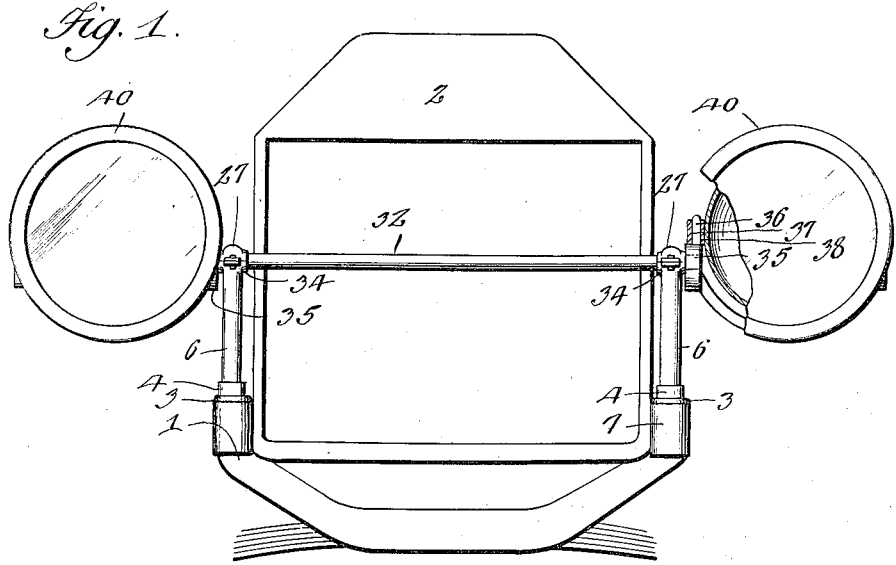
Figure 2:
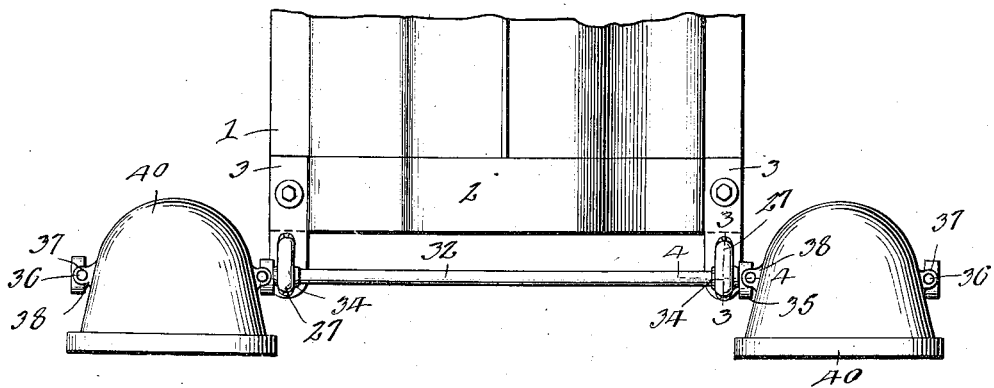
Fig. 2 is a top plan view of the same.
Figure 6:
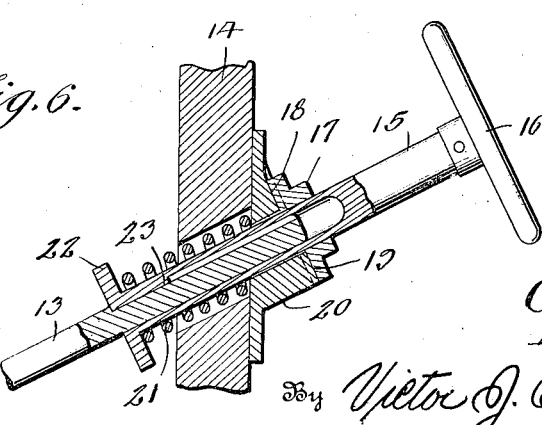
Fig. 6 is an enlarged sectional view taken through the dash of the automobile, in a line with the operating rod and the elements associated therewith, parts of said rod and parts of said elements being broken away and in section.

Upon the frame 1 to the opposite sides of the radiator 2 we secure brackets 3. These brackets are each in the nature of a flat plate having their ends extending beyond the front of the machine formed with upstanding bosses 4. The bosses are provided with openings which are preferably interiorly threaded, and the brackets, upon the under faces thereof, below the bosses are provided with threaded lugs 5, having central openings which communicate with the openings in the bosses.

Preferably threadedly secured in each of the bosses 4 is a hollow vertically disposed post 6, while screwed on one of the lugs 5 is a hollow cap or collar 7. In the showing illustrated the cap or collar 7 is arranged on the left hand side of the machine, but, of course, it may be positioned upon the other side of the machine if desired so that the operating wheel for the device may be thus positioned to either side of the machine to accord with the convenience of the operator.

The hollow member 7 is provided with oppositely disposed round openings forming bearings for a shaft 8, the said shaft extending a suitable distance to the rear of the member 7 along the side of the frame 1, and said shaft is retained in its bearings through the medium of collars 9 adjustably secured thereon and contacting with the cap 7. The end of the shaft 8, arranged along the side of the frame 1, is threaded and has adjustably secured thereon one of the elements 10 of the universal or knuckle joint 11. The second element 12 of the knuckle joint is arranged at an angle with respect to the element 10 and has adjustably secured thereto a rod 13. This rod passes through a suitable bearing opening provided therefor in the dash 14 of the automobile. Arranged on the free end of the rod 13 is a hollow rod or sleeve 15, the outer end of which being provided with an operating wheel 16. On the hollow rod 15 is secured a collar 17 that has its outer face toothed or serrated as at 18, the said teeth engaging in depressions formed between teeth 19 in a bearing member 20 through which the rod 15 passes and which bearing member is secured to the inner face of the dash 14. The toothed collar 17 is normally engaged with the teeth of the bearing through the medium of a spring 21 surrounding the rod and exerting a tension between the bearing 20 and a flange or collar 22 on the outer end of the rod 15. The hollow rod 15 has a key or feather connection 23 with the rod 13 to lock the rods 15 and 13 against independent turning movement but permitting of an outward longitudinal movement of the rod 15 on the rod 13 whereby to bring the toothed collar 17 out of engagement with the toothed bearing and then permit both of the rods being turned in unison to actuate the shaft 8. A release of the handle will permit of the spring 21 drawing the toothed collar again in engagement with the teeth of the bearing 20, thus locking the shaft 8 at a desired position, for a purpose which shall presently be apparent.

Keyed or otherwise secured to the portion of the shaft 8 arranged in the cap 7 is an eccentric wheel 24. The wheel is preferably provided with a peripheral continuous groove within which is received a strap collar 25, and pivotally secured to the collar is a vertically disposed rod 26 that is arranged approximately central in the post 6.

The upper end of the post, upon the left hand side of the machine, within which the rod 26 is arranged, has its upper portion widened inwardly with respect to the radiator on the front of the machine and its upper edge provided with a removable cap plate 27. The upper or outer portion of the rod 26 is arranged at an angle directed in the referred to widened portion of the post, the said angular end of the rod being threaded as at 28 and engaging with female threads in a yoke or sleeve 29. Loosely pivoted to the member 29 is an arm 30 forming one of the elements of a spring band or collar 31 which surrounds a shaft 32 that finds bearings in both of the posts 6. The second arm of the band or collar 31 is arranged over the arm 30, but is slightly spaced therefrom, a binding element, such as a bolt 33 passing through openings in both of the arms and engaging with threads formed in one of the openings.

The ends of the shaft 32 project only a comparatively slight distance through the top or head portions of the post 6, and the bearing openings through which the shaft passes are preferably surrounded by enlargements or bosses 34. The ends of the shafts 32 are threaded to engage in threaded openings provided in castings 35 each of the said members 35 being provided with an outstanding shaft or trunnion 36 receiving the sleeves 37 secured to the supporting frames 38 of the head lamps 40.

It is believed the simplicity of the construction will be apparent from the foregoing description as will the operation of the device. It will be noted that it is merely necessary for the operator to grasp the turning wheel 16, draw the hollow rod 15 toward him so as to bring the toothed collar out of engagement with the teeth of the bearing, and then turn the wheel to turn the shaft 8, revolving the eccentric connected with the shaft and moving the rod 26 vertically through the post 6, causing the latter to swing or rotate the shaft 32, and thus tilting the head lamps 40. A release of the wheel 16 locks the device. The arrangement of the eccentrics and the knuckle joint connection between the rod 13 and the shaft 8 is such that no great strain is imparted to the locking means between the operating wheel and the bearing for the rod or shaft therefor, so that these parts will not be liable to wear, and further description of the construction and operation is believed unnecessary.

What we claim is:

1. The combination with lamps, a shaft supporting the same, a member secured on the shaft provided with an angle arm, a rod adjustably connected with said arm, a second shaft, an eccentric carried by said second shaft and pivotally connected with the rod, operating means for said second shaft, and locking means for said operating means.

2. The combination with lamps, a shaft supporting the same, a member secured on the shaft and having an angle arm, an angle rod adjustably connected with the arm, a second shaft, an eccentric carried by said second shaft and pivotally connected with the arm, a rod having a knuckle joint connection with the second shaft, a hollow member slidable on said rod, turnable with the rod, an operating handle for said member, and locking means for said member.

3. The combination with lamps, a shaft supporting the same, a member secured on the shaft and having an angle arm, a rod adjustably and pivotally connected with said arm, a second shaft, a grooved wheel eccentric secured on said second shaft, a collar in the groove of the wheel, a pivotal connection between said collar and the rod, and operating means for said second shaft.

In testimony whereof we affix our signatures.

CHAS. O. PAUL.
EARL ELSEY.